United States Patent
Disser et al.

(10) Patent No.: US 7,682,257 B2
(45) Date of Patent: Mar. 23, 2010

(54) CONSTANT VELOCITY JOINT

(75) Inventors: Claus Disser, Seligenstadt (DE); Manfred Niederhuefner, Hanau (DE); Mathias Lutz, Tuebingen (DE); Volker Szentmihalyi, Gutach (DE)

(73) Assignees: Shaft-Form-Engineering GmbH, Muehlheim (DE); BF New Technologies GmbH, Muehlheim (DE)

( * ) Notice: Subject to any disclaimer, the term of this patent is extended or adjusted under 35 U.S.C. 154(b) by 0 days.

(21) Appl. No.: 12/195,966

(22) Filed: Aug. 21, 2008

(65) Prior Publication Data

US 2008/0305878 A1    Dec. 11, 2008

Related U.S. Application Data

(63) Continuation of application No. PCT/DE2007/000177, filed on Feb. 1, 2007.

(30) Foreign Application Priority Data

Feb. 22, 2006  (DE) .................. 10 2006 008 526

(51) Int. Cl.
*F16D 3/223* (2006.01)
(52) U.S. Cl. ............... 464/182; 464/906; 403/359.6
(58) Field of Classification Search .......... 464/145, 464/170, 182, 906; 403/359.6, 381, 409.1
See application file for complete search history.

(56) References Cited

U.S. PATENT DOCUMENTS

| | | | | |
|---|---|---|---|---|
| 1,665,280 A | * | 4/1928 | Rzeppa | ........................ 464/145 |
| 2,038,554 A | * | 4/1936 | Edgar | |
| 4,698,047 A | * | 10/1987 | Welschof et al. | ............ 464/145 |
| 5,503,494 A | | 4/1996 | Kamata et al. | |
| 5,664,655 A | * | 9/1997 | Oh | ........................ 403/359.6 X |
| 7,040,992 B2 | * | 5/2006 | Dine et al. | .................. 464/170 |
| 7,104,893 B2 | * | 9/2006 | Ouchi et al. | ................ 464/906 |

FOREIGN PATENT DOCUMENTS

| | | | |
|---|---|---|---|
| DE | 91 16 324 U1 | * | 10/1992 |
| DE | 197 39 934 A1 | | 4/1998 |
| DE | 298 23 919 U1 | * | 2/2000 |
| DE | 101 08 365 A1 | | 9/2002 |
| DE | 10 2005 019 200 B3 | | 1/2007 |
| JP | 55-72921 A | * | 6/1980 ................. 464/145 |
| JP | 58-211019 A | | 12/1983 |
| WO | WO 2006/037355 A1 | | 4/2006 |

OTHER PUBLICATIONS

International Search Report for PCT/DE2007/000177.

* cited by examiner

*Primary Examiner*—Greg Binda
(74) *Attorney, Agent, or Firm*—Crowell & Moring LLP

(57) ABSTRACT

A constant velocity joint having an inner hub and an outer hub (1) in which races or tracks (3) associated with one another in pairs are provided and with balls received in respective pairs of races or tracks for transmitting torque. The constant velocity joint is further provided with at least one joint connector (2) which, when the joint is assembled, is connected in a rotationally fixed manner to one of the hubs (1) by mating profile members (6, 7) in order to transmit torque.

7 Claims, 1 Drawing Sheet

CONSTANT VELOCITY JOINT

CROSS REFERENCE TO RELATED APPLICATIONS

This application is a continuation of international patent application no. PCT/DE2007/000177, filed Feb. 1, 2007, designating the United States of America, and published in German on Aug. 30, 2007 as WO 2007/095885, the entire disclosure of which is incorporated herein by reference. Priority is claimed based on Federal Republic of Germany patent application no. DE 10 2006 008 526.4, filed Feb. 22, 20006.

BACKGROUND OF THE INVENTION

The invention relates to a constant velocity joint with an inner hub and an outer hub, each provided with a plurality of tracks associated with each other in pairs, which accommodate balls guided in a cage to transmit a torque between the inner hub and the outer hub, and with at least one joint connector that is connected to one of the hubs via mutually associated profiles of the hub and the joint connector to transmit a torque in the assembled state of the joint.

Such constant velocity joints are used, for example, in longitudinal driveshafts or in axle shafts of motor vehicles to transmit a torque from an engine to the driven wheels. In the constant velocity joints disclosed in U.S. Pat. No. 7,396,284 (=DE 102 09 933) and GB 2,419,391 (=DE 103 40 583), the outer hub is enclosed by a driver housing, which is, for example, firmly welded to a tubular shaft. The outer hub and the driver housing have profiles associated with each other to transmit a torque. In the assembled state of the joint, the driver housing is axially fixed by a flange on the outer hub.

The profiles are typically formed by grooves and projections extending substantially in axial direction of the joint and having axially parallel sidewalls or flanks with a transition fit. Today, high-precision production processes are usually used for the joint components, such as a chipless process, for example. The transition fit should on the one hand enable the driver housing to be pushed onto the outer hub with maximum ease during assembly and should on the other hand provide the tightest fit possible between the driver housing and the outer hub in the assembled state of the joint.

However, because of the transition fits, there may be a slight play in operation between the outer hub and the driver housing, which causes a minimal relative movement between these components, particularly upon changes in the direction of rotation. In other words, with each change in the direction of rotation of the joint, there may be a differential movement in the joint before the circumferentially arranged sidewalls or flanks of the grooves and projections are adjacent to each other. This can cause an undesirable cracking noise in the joint.

US patent publication no. US 2007/032303 (=DE 103 42 497) proposes a journal and an inner hub designed in such a way that some radial play initially remains when the journal is inserted into the hub to enable the journal to be inserted by hand with ease. Only at the end of the displacement path do the journal and the hub fit tightly against each other in radial direction.

SUMMARY OF THE INVENTION

It is therefore an object of the present invention to provide a constant velocity joint of the above-described type, which can be easily assembled.

Another object of the invention is to provide a constant velocity joint in which there is no differential movement between the circumferentially joined components, such as a hub and a joint connector, even when there are load changes or changes in the direction of rotation.

According to the invention, this object is essentially achieved by constructing the profiles in such a way that when the joint is assembled, the hub is connected to the joint connector with a press fit for rotational fixation at least in circumferential direction.

In particular, in the assembled state of the joint, the hub is connected to the joint connector with an elastic bias. When the hub and the joint connector are clamped together in this way, a relative movement or differential movement between these circumferentially joined components is no longer possible even if there are load changes or changes in the direction of rotation.

The profiles are preferably designed and adapted to each other such that the joint connector, during assembly of the joint, is displaceable with ease relative to the hub with a clearance or transition fit relative to the hub, at least for a part of the axial displacement path of the joint connector, and only during a terminal part of the axial displacement path is the hub connected to the joint connector with a press fit for rotational fixation. Substantial ease of displacement means that the displacement may optionally even be done by hand without using any additional tool. This enables a manual preassembly and therefore helps simplify the connection of the shaft to the joint. In particular, a good pre-alignment is achieved with this manual preassembly. A greater force caused by increased friction must then be applied only in the second or terminal part of the insertion path, for example, by using a tool. However, because of the extensive manual preassembly, assembly in the second part of the insertion path can be done with relatively simple tools.

According to a preferred embodiment of the invention, the profiles are formed by mutually associated projections and recesses provided on circumferential surfaces of the hub and the joint connector that lie opposite each other. For example, a plurality of grooves can be provided on the outer surface of an outer hub and corresponding projections or driving webs can be formed on the inner surface of a driver housing that forms the joint connector.

The profiles and/or the joint connector can have a depth and/or height that changes in axial direction of the joint such that the hub in the assembled state of the joint is connected to the joint connector with a press fit for rotational fixation. For example, the depth of the grooves formed on the outer surface of an outer hub can decrease in axial direction of the outer hub from the side that faces a driver housing during assembly toward the side that faces away from the driver housing during assembly. Given a constant height of the projections on the inner surface of a driver housing, the projections can therefore initially be inserted into the grooves with ease. At the end of the assembly there is clamping between the grooves and the projections, which results in a press fit that prevents a differential movement between the hub and the joint connector. As an alternative or in addition, the height of the projections can also suitably change, so that this effects a clamping between the hub and the joint connector.

According to another embodiment of the invention the width of the profiles of the hub and/or the joint connector changes in axial direction of the joint such that in the assembled state of the joint a rotationally fixed press fit is achieved between the hub and the joint connector. Here, too, the projections or the like can initially be inserted with ease into grooves, for example, so that the press fit preventing a relative movement between these components is established only when the driver housing or a similar joint connector has been fully pushed onto the hub.

According to the invention, the profiles of the hub and/or the joint connector can be formed by sidewalls or flanks lying circumferentially opposite each other, such that, for example, two sidewalls of a groove and two sidewalls of a projection are inclined in relation to each other, so that the hub is connected to the joint connector with a press fit for rotational fixation in the assembled state of the joint. The sidewalls can, for example, extend radially and are, for example, cone-shaped or truncated-cone-shaped. This makes it possible to clamp the hub and the joint connector against each other, so that no relative movement occurs between these components even if there are load changes or changes in rotational direction.

Another option to achieve the rotationally fixed press fit according to the invention between a hub and a joint connector is to mutually associate the profiles of the hub and the joint connector with a defined pitch error. In particular, some of the grooves or projections are offset in the one (circumferential) direction whereas other groves or projections are offset in the other (circumferential) direction. This ensures that no differential movement occurs between these components when there is a change in the direction of rotation.

To axially fix or bias the hub and the joint connector in the assembled state of the joint, the joint connector, which is configured as a driver housing, for example, can be fixed in a biased manner by a flange on the outer hub of the joint. With this axial bias, a press fit can be achieved between the hub and the joint connector by a corresponding configuration of the profiles.

In the constant velocity joint according to the invention it is preferred if at least the hubs and the at least one joint connector are produced in a substantially chipless process. For example, the outer hub can be formed from a solid ring or a sheet metal part. The driver housing is preferably also a formed from a sheet metal part, which can, for example, be welded to a tubular shaft. As an alternative it is also possible to profile the end of a tubular shaft to form a driver housing or a similar joint connector. It is also possible, however, to produce the constant velocity joint according to the invention, either in its entirety or in part, using a chip-forming process.

The invention further relates to a joint shaft having a constant velocity joint that is preferably configured as a fixed joint of the above-described type. The invention further relates to a vehicle with such a constant velocity joint.

In principle it is also possible to design the constant velocity joint according to the invention as a slip joint. The rotationally fixed press fit or a similar connection preventing differential movement does not have to be provided between an outer hub and a driver housing. Such a connection may instead also be provided between an inner hub and a journal or a similar joint connector element of such a connection to prevent a relative movement between such components joined along the circumference even if there are load changes or changes in the direction of rotation.

BRIEF DESCRIPTION OF THE DRAWINGS

The invention will be described in further detail hereinafter with reference to an illustrative embodiment shown in the accompanying drawings, in which.

DETAILED DESCRIPTION OF PREFERRED EMBODIMENTS

Figure 1:
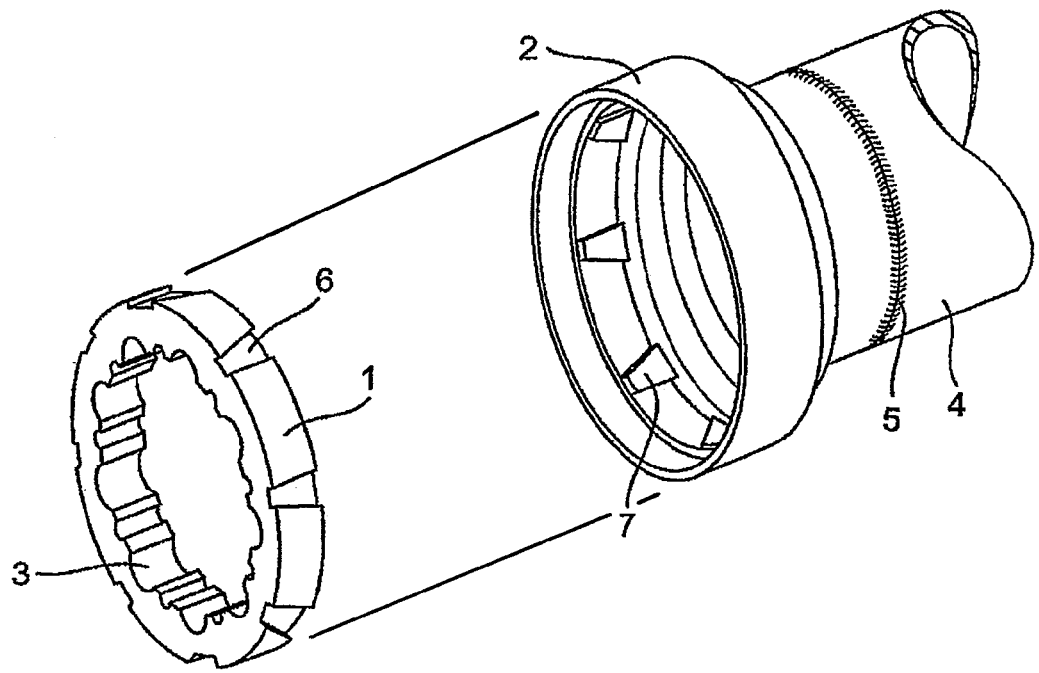
FIG. 1 is a schematic perspective view of an outer hub and a driver housing of a joint according to the invention.

FIG. 1 schematically shows an annular outer hub 1 of a constant velocity fixed joint on the left and a joint connector configured as a driver housing 2 on the right. On its inner surface, the outer hub 1 has a plurality of tracks 3 that can, for example, be configured as described U.S. Pat. No. 7,396,2844, the entire disclosure of which is incorporated herein by reference. The areas of the inner surface of the outer hub 1 lying between the tracks 3 can be designed to guide a cage, which is not shown in the figure. Furthermore an inner hub (not shown) with tracks on its outer surface associated with the tracks 3 of the outer hub 1 can be inserted into the outer hub 1, such that the tracks accommodate balls to transmit a torque between the inner hub and the outer hub 1. The balls may be guided in windows of the cage.

On its right side as shown in FIG. 1, the driver housing 2 is connected to a tubular shaft 4, e.g., by a weld indicated by the weld seam 5. To assemble the joint, the inner hub is first inserted into the outer hub 1, such that balls are accommodated in the tracks 3. The driver housing 2 is then pushed over the outer hub 1 and in particular axially fixed on the outer hub 1 by a flange.

Figure 2:
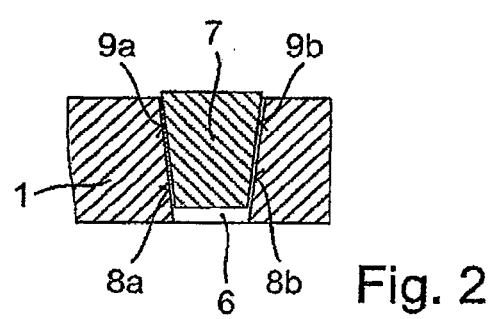
FIG. 2 is a schematic cross-sectional detail view of the profile on an outer hub and a driver housing of a joint according to the invention.

To transmit a torque between the outer hub 1 and the driver housing 2, a plurality of grooves 6 are provided on the outer surface of the outer hub 1 and a plurality of projections 7 or driving webs are formed on the inner surface of the driver housing 2. As may be seen from the cross-sectional view of FIG. 2, the circumferentially opposite side walls 8a and 8b of each groove 6 do not extend parallel to each other. Rather, in radial direction the sidewalls 8a and 8b are conically inclined in relation to each other. The sidewalls 9a and 9b of each projection 7 of the driver housing 2 are also inclined in relation to each other so that the projections 7 have the shape of a truncated cone in cross section.

FIG. 1 further shows that the width of the grooves increases from the side of the outer hub 1 facing away from the driver housing 2 toward the side of the outer hub 1 facing toward the driver housing 2. The width of the grooves 6 therefore also widens conically in axial direction. The projections 7 are designed correspondingly to extend conically in axial direction.

If the driver housing 2 is now pushed onto the outer hub 1 to assemble the joint, the sidewalls 8a and 9a or 8b and 9b do not initially contact each other. Only when the driver housing 2 has been completely pushed over the outer hub 1 and is axially fixed on the outer hub 1 are the flanks or sidewalls of the grooves 6 and the projections 7 pressed against each other. This prevents any relative movement between the outer hub 1 and the driver housing 2 in circumferential direction. With the mutual clamping of the sidewalls of the grooves 6 and the projections 7, an elastic deformation of the grooves 6 and/or the projections 7 may also occur. Because of the biasing or clamping between the hub 1 and the joint connector 2, no differential movement between the outer hub 1 and the driver housing 2 is possible even if there are load changes or changes in the direction of rotation of the joint. This eliminates irritating noise in the joint during operation.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. In a constant velocity joint comprising
an inner hub and
an outer hub,
wherein said inner hub and said outer hub are each provided with a plurality of tracks, with tracks of said inner hub being associated in pairs with respective tracks of said out hub, and
with balls received in respective pairs of tracks for transmitting torque between the inner hub and the outer hub,
said joint further comprising at least one joint connector which, when the joint is assembled, is connected to the outer hub via mutually associated interengaging profiles on said outer hub and on the joint connector for transmitting torque,
the improvement comprising:
said interengaging profiles being constructed such that, when the joint is assembled, said outer hub is connected to the joint connector in a rotationally fixed manner by a press fit in at least the circumferential direction, and
the interengaging profiles being constructed such that during assembly of the joint, the joint connector is displaceable along a displacement path relative to the hub, with the joint connector being readily displaceable with a clearance relative to the hub along a first portion of said displacement path, and
said joint connector being connected to the hub with a press fit for rotational fixation only along a terminal portion of said displacement path.

2. A constant velocity joint as claimed in claim 1, wherein the profiles comprise mutually associated projections and recesses provided facing each other on circumferential surfaces of the hub and the joint connector.

3. A constant velocity joint as claimed in claim 1, wherein the profiles of the hub and the joint connector exhibit a change in width in the axial direction of the joint such that when the joint is assembled, the hub is connected to the joint connector with a press fit for rotational fixation.

4. A constant velocity joint as claimed in claim 1, wherein the profiles of the hub and the joint connector have axially converging sidewalls facing each other such that when the joint is assembled, the hub is connected to the joint connector with a press fit for rotational fixation.

5. A constant velocity joint as claimed in claim 1, wherein said joint connector comprises a driver housing fixed to an end of a tubular shaft.

6. A constant velocity joint as claimed in claim 5, wherein the profiles are provided on an outer surface of the outer hub and on an inner surface of the driver housing which faces the outer hub when the joint is assembled.

7. A constant velocity joint as claimed in claim 1, wherein at least the hubs and the joint connector are produced in a chipless forming process.

\* \* \* \* \*